United States Patent [19]

Ermacora

[11] Patent Number: 5,136,828
[45] Date of Patent: Aug. 11, 1992

[54] FARM MACHINE WHICH DETECTS AN INTERMEDIATE POSITION OF A CONNECTING DEVICE

[75] Inventor: Rino Ermacora, St Jean Saverne, France

[73] Assignee: Kuhn S.A., Saverne Cedex, France

[21] Appl. No.: 677,527

[22] Filed: Mar. 29, 1991

[30] Foreign Application Priority Data

Apr. 5, 1990 [FR] France ................. 90 04693

[51] Int. Cl.⁵ ................ A01B 73/00; A01B 59/041; A01B 59/042; A01D 34/66
[52] U.S. Cl. ...................... 56/10.2; 56/14.9; 56/15.5; 280/463; 280/43.23
[58] Field of Search ............ 56/2, 6, 10.2, 228, 56/14.9, 15.1, 15.5, 15.2, 15.4, DIG. 15, DIG. 11; 172/240, 244; 280/463, 468, 415.1, 43.23

[56] References Cited

U.S. PATENT DOCUMENTS 3,893,283  7/1975  Dandl .......................... 56/6
4,558,560  12/1985  Koch .......................... 56/228
4,858,418  8/1989  Allwoerden .................. 56/15.5
4,979,359  12/1990  Inskeep .................. 56/15.5 X

FOREIGN PATENT DOCUMENTS

2226101  11/1974  France .
2024598  1/1980  United Kingdom .
WO8809610  12/1988  World Int. Prop. O. .

Primary Examiner—Stephen J. Novosad
Attorney, Agent, or Firm—Oblon, Spivak, McClelland, Maier & Neustadt

[57] ABSTRACT

The invention relates to a farm machine. According to the present invention, the farm machine features a detection device which detects an intermediate position of a connecting device and cuts off the supply to a maneuvering element when the connecting device comes from an end work position into an intermediate position. The action of the detection device can be cancelled so that the maneuvering element can bring the connecting device beyond the intermediate position into the other end position.

34 Claims, 9 Drawing Sheets

Fig. 19

FARM MACHINE WHICH DETECTS AN INTERMEDIATE POSITION OF A CONNECTING DEVICE

BACKGROUND OF THE INVENTION

1. Field of the Invention

This invention relates to a farm machine comprising a body and a means for connecting the body to a motor vehicle. The connecting means is connected to the body by a joint with an axis directed upward which is able to be brought into two end positions, one of which is a work position, and into an intermediate position, by pivoting around the axis under the action of a maneuvering element.

2. Discussion of the Background

A mower comprising a body which extends to work crosswise to the direction of its movement or advance while it is operating or working is known in the prior art. The body comprises in particular a frame which during work rests on the ground by two working wheels each extending close to a respective outside end of the frame. Each working wheel is connected to the frame by a wheel arm which is itself connected to the frame by a joint of the pivot type with a geometric axis directed perpendicular to the direction of its advance while working. A first hydraulic cylinder is further provided between each wheel arm and the frame making it possible to make the wheel arm and the corresponding working wheel pivot relative to the frame around the geometric axis of the corresponding joint.

During transport, when the longitudinal axis of the body extends parallel to the direction of transport, the frame rests on the ground by two transport wheels which extend on both sides of the body and in the median part of the body. Each transport wheel is connected to the frame by a wheel arm which is itself connected to the frame by a joint of the pivot type with a geometric axis directed perpendicular to the direction of its advance while working. A second hydraulic cylinder is further provided between the two wheel arms which makes it possible to make the wheel arms and the transport wheels pivot around the geometric axes of the corresponding joints.

A tongue, which makes it possible to hitch the mower to a tractor, is connected to the body, in the median part of the body, by a joint of the pivot type with a geometric axis which is at least approximately vertical. The angular position of the tongue relative to the body ca be modified by making the tongue pivot around the axis. Putting into the desired angular position and maintaining in the latter are achieved by a third hydraulic cylinder connected, on the one hand, to the body and, on the other hand, to the tongue.

To bring the mower from a work position, in which the longitudinal axis of its body extends crosswise to the direction of its advance while working, into a transport position, in which the longitudinal axis of its body extends parallel to the direction of transport, this mower uses the following transformation process:

the first two cylinders lift the body of the machine which rests on the two working wheels to bring it into a position off the ground;

the second cylinder operates two transport wheels, different from the working wheels, which extend on both sides of the body of the machine and which rotate in planes parallel to the longitudinal axis of the body of the machine;

the first two cylinders lift the two working wheels to make the body of the machine rest only on the two transport wheels; and the third cylinder makes the hitching tongue pivot relative to the body of the machine, from a work position into the transport position.

In this known mower, it is provided that the hitching tongue can occupy two work positions and one transport position. One of the work positions as well as the transport position are end positions, while the other work position is an intermediate position. This intermediate position can be achieved only by trial and error. On this point, the use of the machine is therefore not very easy.

Mowers are also known in which the hitching tongue can occupy two work positions arranged at least approximately symmetrically relative to a vertical plane directed in the direction of its advance while working and passing through the axis of the joint connecting the hitching tongue to the body of the mower.

By applying this technique to the first mower, it is therefore necessary that the user be able, on the one hand, to easily and, on the other hand, to precisely find the intermediate position that the hitching tongue is to occupy.

SUMMARY OF THE INVENTION

Accordingly, one object of the present invention is an improved farm machine which solves these above-noted drawbacks.

For this purpose, the farm machine according to this invention is characterized by the fact that a detection device detects the intermediate position of the connecting means and cuts off the power supply to the maneuvering element when the connecting means comes from the end work position into the intermediate position, and that the action of the detection device can be cancelled so that the maneuvering element can bring the connecting means beyond the intermediate position into the other end position.

As a result of such a feature, the connecting means will always occupy, in a very precise manner, the desired intermediate position.

Moreover, no trial and error is necessary since the power supply to the maneuvering element acting on the connecting means is automatically cut off when the connecting means reaches the intermediate position. The farm machine of the present invention is therefore very easy to use.

Since it is provided in the present invention that the action of the detection device can be cancelled, the connecting means can therefore also be brought into the other end position.

To facilitate the mounting and the connection of the detection device, it is provided, according to an additional feature of this invention, that the detection device is connected to the body of the farm machine.

To allow the maneuvering element to bring the connecting means beyond the intermediate position into the other end position, the action of the detection device is to be cancelled, as stated above. For this purpose, it is provided, in an embodiment, that the detection device is retractable.

In an advantageous solution, a joint connects the detection device to the body of the machine. The detection device can thus be retracted by pivoting around the joint.

According to another feature of this invention, a retracting means intended to retract the detection device and able to be actuated from the motor vehicle is provided. This retracting means is preferably arranged on the detection device.

In one embodiment of the present invention, the retracting means comprises at least one cylinder. A particularly advantageous solution is obtained when the retracting means comprises two plunger cylinders which extend at least approximately without play between two stops integral with the body of the machine. In this manner, it is possible, by actuating one of the plunger cylinders, to place the detection device in an operational position, and by actuating the other plunger cylinder, to place the detection device in the retracted position.

According to another additional feature of this invention, it is provided that an elastic element contributes at least partially to maintaining the detection device in an operational position. In the case where the retracting means comprises a cylinder, an electromagnet, etc., is provided to place and to maintain the detection device in an operational position, the latter can be assisted by the elastic element which contributes to maintaining the detection device in an operational position.

It is also possible, according to the present invention, that the elastic element has, as a dual function, putting into an operational position and maintaining the detection device in the latter.

According to an additional feature of the present invention, the detection device further comprises a control element able to occupy two positions: a first position in which the power supply to the maneuvering element is established and a second position in which the power supply to the maneuvering element is cut off.

When the maneuvering element is supplied the power connecting element rotates relative to the body of the machine to the desired intermediate position. In reaching this position, the passage of the control element from the first position to the second position is achieved by a cam acting on the control element. This action cuts off the power supply to the maneuvering element and immobilizes the connecting means.

The cam can either be connected directly or indirectly to the connecting means. It can, in particular, be provided that the part of the maneuvering element connected to the connecting means of the machine is equipped with the cam. Preferably, the maneuvering element is a cylinder and the cam is integral with this cylinder.

According to an additional feature of this invention, it is provided that the control element controls a distributor arranged on the detection device. This distributor can advantageously be a distributor of the 2/2 type equipped in parallel with a nonreturn valve.

The maneuvering cylinder, controlled by the 2/2 distributor, is mounted in series with the latter in the same circuit. This circuit thus constituted, and the cylinder or cylinders of the retracting means defined above are supplied by a common circuit. A mounted inverter, downstream from the common circuit, makes it possible to supply either the circuit of the maneuvering cylinder or the circuit of the cylinder or cylinders with the retracting means of the detection device.

To allow the maneuvering element to bring the connecting means beyond the intermediate position into the other end position, the action of the detection device is to be cancelled, as stated above. For this purpose, another 2/2 type distributor is provided, in another embodiment, whose opening and closing is controlled by a control element, and which is connected in parallel with the 2/2 distributor of the detection device.

When it is provided that, during transport, the machine rests on transport wheels, at least one of them can, according to an additional feature of the invention, act directly or indirectly on the control element to control the opening of this other distributor when it is brought into the transport position.

In this solution, the maneuvering cylinder of the connecting means, controlled by the 2/2 distributor of the detection device, is also mounted in series with the latter in the same circuit. This circuit thus constituted and the maneuvering circuit of the wheels used during transport are supplied by a common circuit. An inverter mounted downstream from the common circuit makes it possible to supply either the circuit of the maneuvering cylinder of the connecting means or the circuit of the maneuvering cylinder or cylinders used during transport.

The inverter provided in the first solution or in the second solution can be advantageously controlled from the motor vehicle by a control element.

A particularly advantageous solution is obtained when the inverter is an inverter with a pivoting lever cooperating with the control element. This control element can consist of a traction element connected to the pivoting lever of the inverter and maneuverable from the motor vehicle.

According to an additional feature of the present invention, the body of the farm machine rests on the ground by wheels, of which at least one part rotates, during work, in planes of rotation extending at least approximately orthogonally to the longitudinal direction of the body and of which at least one part rotates and, during transport, in planes of rotation extending at least approximately parallel to the longitudinal direction of the body.

In this characteristic, three categories of wheels are considered: the wheels used only during work, the wheels used during work and during transport and the wheels used only during transport. Later, the expression "wheels used during transport" will recur several times. Of course, this expression includes the wheels used only during transport as well as the wheels used during transport and during work.

Thus, according to another additional feature of the present invention, the wheels used during transport are brought into the transport position by at least one maneuvering element.

In an advantageous embodiment, the maneuvering elements can be cylinders making it possible to bring the wheels used during transport from their work position into their transport position and conversely. In particular, a maneuvering element or a cylinder can be combined with each wheel used during transport.

When the maneuvering elements of the wheels used during transport are cylinders, it can be provided in some embodiments that the circuit of the maneuvering cylinders comprises at least one flow divider. This flow divider or these flow dividers would then supply the maneuvering cylinders according to the same flow, thus making it possible to put all the wheels used during transport simultaneously either into their transport position or into their work position.

According to a particularly advantageous feature of the present invention, the circuit of the retracting cylinder or cylinders of the retracting means and the circuit of the maneuvering cylinder or cylinders of the wheels used during transport could be coupled in parallel. Such an arrangement makes it possible to combine the retraction of the detection device of the connecting means and the putting into transport position of wheels used during transport.

According to another feature of the present invention, it is provided that the intermediate position of the connecting means is another work position and that the other end position of the connecting means is the transport position.

To pass the connecting means from its intermediate work position into its end transport position, it is necessary previously to retract the detection device of the connecting means. In an entirely hydraulic embodiment, this operation simultaneously puts the wheels used during work into their transport position, thus making it possible to immediately put the farm machine into its transport position.

According to an additional feature, the joint connecting the connecting means to the body of the farm machine can extend, in a top view, in the median part of the body, being considered crosswise to the direction of its advance while working. In this way, the two work positions of the connecting means can easily extend at least approximately symmetrically relative to a vertical plane directed in the direction of its advance while working and passing through the axis of the joint connecting the connecting means to the body.

According to another additional feature of the present invention, it is possible that this farm machine is a harvesting machine. A particularly advantageous solution is obtained when the harvesting machine is a mower with or without elements for processing the product.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 14 represents a side view of the farm machine resting on the transport wheels;

DESCRIPTION OF THE PREFERRED EMBODIMENTS

Figure 1:
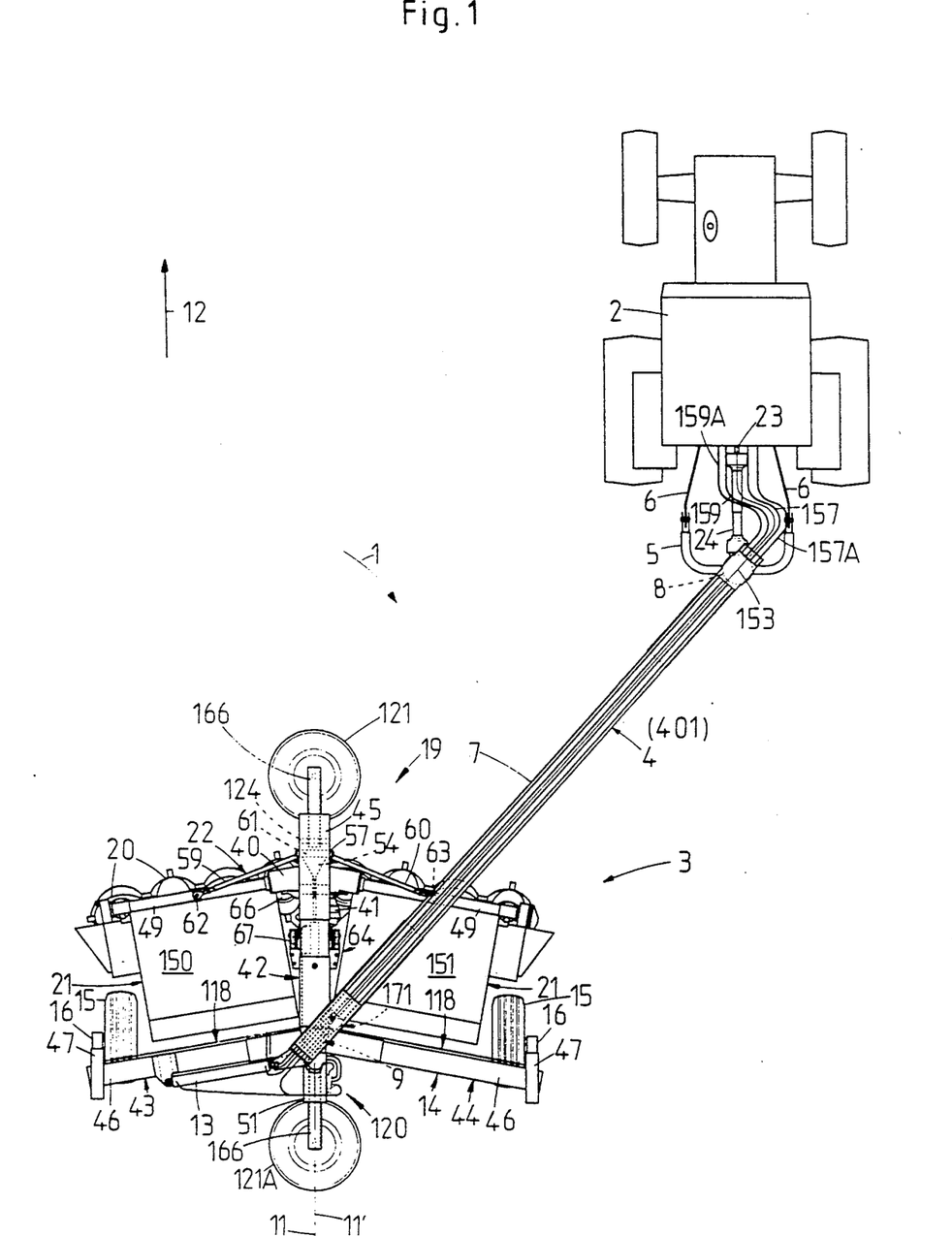
FIG. 1 represents a top view of a farm machine according to the present invention hitched to a farm tractor and working to the left of the tractor.

Referring now to the drawings, wherein the reference numerals designate identical or corresponding parts throughout the several views, and more particularly to FIG. 1 thereof, which shows a mower (1) according to the invention in which the mower is hitched to a farm tractor (2).

In the following description, the concepts "front" and "rear" are defined relative to the direction of advance (12) of mower (1) during mowing, and the concepts "right" and "left" are defined when looking at mower (1) from the rear, in its direction of advance (12) during mowing.

The mower (1) consists of a body (3) and a tongue (4). Tongue (4) consists of a primary tongue (5) intended to be hitched to lower arms (6) of the hitch of farm tractor (2) and a secondary tongue (7) connected to body (3) of mower (1). Primary tongue (5) is connected at the front end of secondary tongue (7) by a connecting device (8) known to one skilled in the art and which allows in particular a pivoting of primary tongue (5) relative to secondary tongue (7) around an axis which is at least approximately vertical. Close to its rear end, secondary tongue (7) is connected to body (3) by a joint (9) with geometric axis (10) (see FIG. 2) at least approximately vertical and extending at least approximately in median vertical plane (11) of body (3), directed in the direction of advance (12) of the mower while working. The angular position of tongue (4) relative to body (3) can be modified by making tongue (4) pivot around axis (10) of joint (9). Putting body (3) into the desired angular position and maintaining it are achieved by a maneuvering cylinder (13) combined with a detection device (120). Thanks to this arrangement, body (3) of mower (1) can, while working, extend —seen from the rear in the direction of its advance (12) while working—either to the right (402) or to the left (401) of farm tractor (2). This allows for back and forth mowing.

Body (3) of mower (1) comprises a frame (14) which rests on the ground—while working—by two working wheels (15) which each extend close to one respective outside end of frame (14). Each working wheel (15) is connected to frame (14) by a wheel arm (16), which itself is connected to frame (14) by a joint of a pivot type (17) with a geometric axis directed at least approximately perpendicular to its direction of advance (12) while working. The geometric axes of joints (17) of two working wheels (15) are at least approximately merged. A hydraulic cylinder (11), which makes it possible to make wheel arm (16) and corresponding working wheel (15) pivot relative to frame (14) around the geometric axis of corresponding joint (17), is further provided between each wheel arm (16) and frame (14). This makes it possible for frame (14) to be brought close to the ground (109) during the mowing phase and to be removed away from the ground (109) when the mowing is interrupted.

The shape of frame (14) also comes out very precisely in FIG. 1. Frame (14) essentially consists of a median element (42) and two side elements (43, 44), each extending from one respective side of the median element (42). Median element (42) mainly comprises a bearing (38) and two brackets (45, 51) which extend at least approximately horizontally and at least approximately in the direction of advance (12) while working. These two brackets—one front bracket (45) and one rear bracket (51)—are connected rigidly, but nevertheless in a removable manner, to the front, or to the rear of bearing (38). Side elements (43, 44) each comprise a beam (46) extending at least approximately horizontally and crosswise to the direction of advance (12) while working, and to the outside end of which, i.e., the end distant from bearing (38), is attached a strut (47), extending downward. Wheel arm (16) of each corresponding work wheel (15) is connected to the lower end of each strut (47). Each side element (43, 44) is also connected rigidly and in a removable manner to bearing (38).

Figure 2:
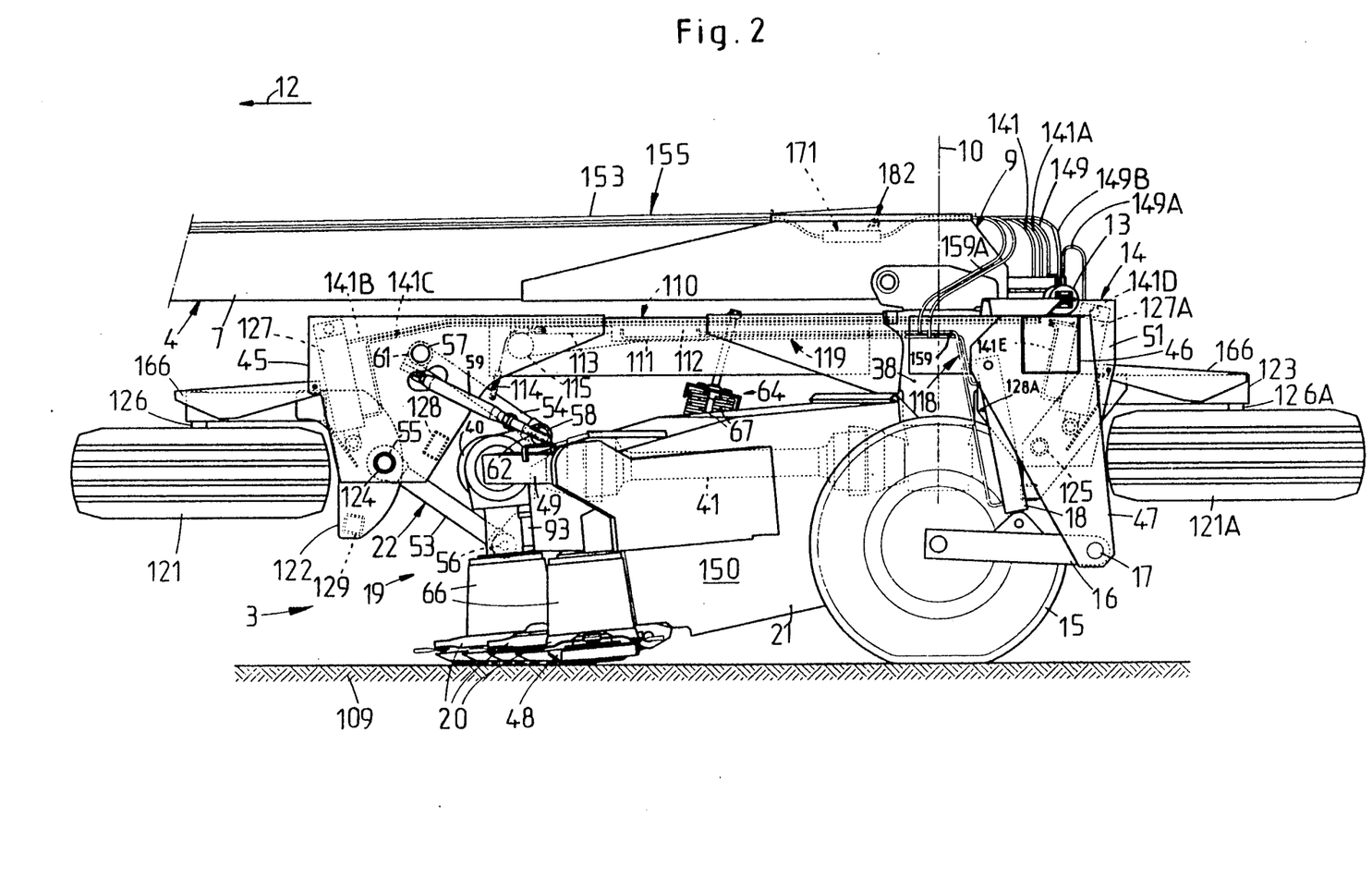
FIG. 2 represents a side view of the body of the machine in a work position.
Figures 3, 4, 5:
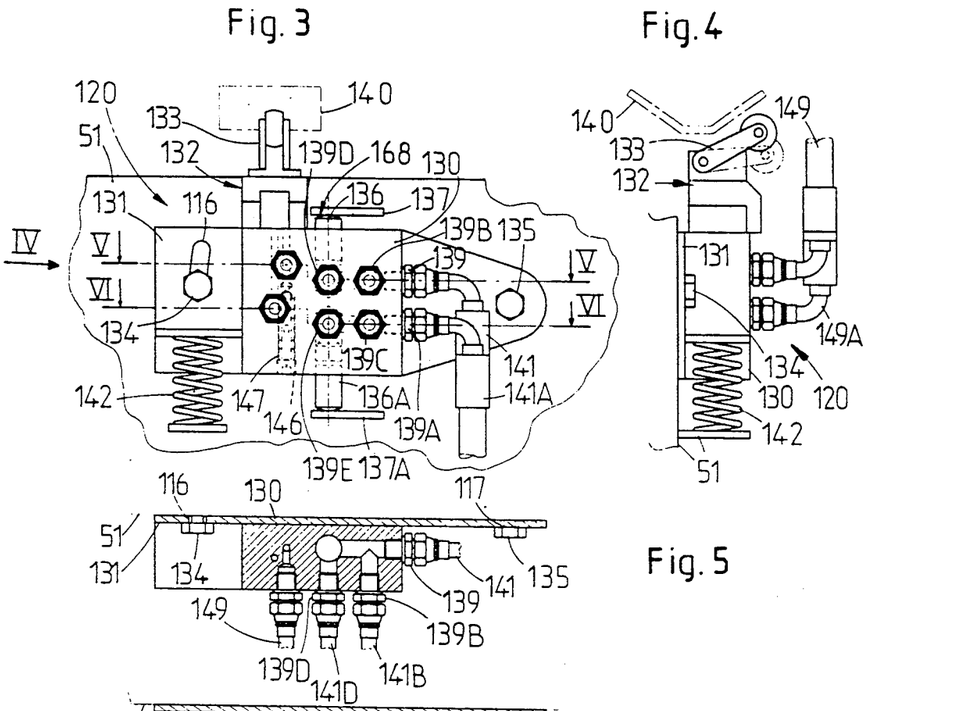
FIG. 3 represents a view of the retractable detection device.
FIG. 4 represents a view of the detection device along arrow IV defined in FIG. 3.
FIG. 5 represents a section of the detection device along plane V—V of FIG. 3.
Figure 6:
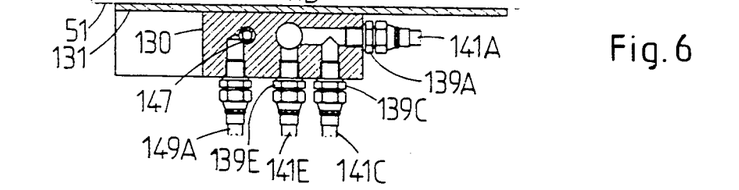
FIG. 6 represents a section of the detection device along plane VI—VI of FIG. 3.

In FIGS. 1 and 2, it is further shown that mower (1) comprises a harvesting mechanism (19) which extends under front bracket (45) of median element (42) of frame (14) and crosswise to its direction of advance (12) while working. This harvesting mechanism (19) essentially consists of a cutting bar (48) supporting cutting elements (20), an intake housing (40) and two carrying structures (49) supporting in particular processing elements (21). Intake housing (40) is located more precisely under front bracket (45) and in median vertical plane (11') of harvesting mechanism (19) directed in the direction of advance (12) while working. In the example shown, the median vertical plane (11') is merged with vertical plane (11) of body (3). Two carrying structures (49), arranged symmetrically relative to the median plane (11') are connected in a removable manner on both sides of this intake housing (40). These carrying structures (49) extend approximately horizontally and approximately parallel to side elements (43, 44) of frame (14). Processing elements (21) are divided into two groups (150, 151) of processing elements (21), each attached to a respective carrying structure (49) of harvesting mechanism (19). They extend behind cutting elements (20) for the purpose of processing the product cut by the latter. The two processing element groups (150, 151), are, like carrying structures (49), arranged symmetrically relative to median plane (11') of harvesting mechanism (19).

A suspension device (22), comprising in particular two suspension elements (53, 54), connects harvesting mechanism (19) to frame (14). First suspension element (53) is connected by two ball joint connections (55, 56), on the one hand, to front bracket (45) of frame (14) and, on the other hand, to a crossbeam (93) of harvesting mechanism (19). Second suspension element (54), located above first suspension element (53), is connected to front bracket (45) of frame (14) by a pivot connection (57) as well as to intake housing (40) of harvesting mechanism (19) by a ball joint connection (58). These two suspension elements (53, 54) form an approximately vertical deformable parallelogram, making possible a good adaptation of harvesting mechanism (19) to ground (109). This suspension device (22) also comprises two lateral suspension elements (59, 60). Each lateral suspension element (59, 60) is connected by a ball joint connection (61) to front bracket (45) of frame (14) and by another ball joint connection (62, 63) to respective carrying structure (49) of harvesting mechanism (19). These two lateral suspension elements (59, 60) are arranged symmetrically on both sides of front bracket (45) to prevent the pivoting of harvesting mechanism (19) around a straight line passing through the centers of the two ball joint connections (56, 58) of suspension elements (53, 54). As a result, suspension device (22) only allows a movement of harvesting mechanism (19) in a direction directed upward, as well as an inclination of the harvesting mechanism (19) relative to frame (14) crosswise to its direction of advance (12) while working.

A lightening device (64), whose structure comes out in FIGS. 1 and 2, cooperates with suspension device (22). This lightening device (64) comprises a group of four draw springs (67) located in the vicinity of the vertical plan directed in the direction of advance (12) while working and containing the center of the weights of harvesting mechanism (19). It is also seen that the lightening device (64) extends between two groups (150, 151) of processing elements (21) and just behind two rotors (66) extending close to one another in the median part of cutting bar (48).

The driving of harvesting mechanism (19) is achieved from power takeoff (23) of tractor (2) which drives, by a telescopic shaft with universal joints (24), a kinematic chain known to one skilled in the art and which ends in intake housing (40) of harvesting mechanism (19) by another telescopic shaft with universal joints (41).

As can be seen in FIG. 2, mower (1) also comprises a lifting device (110) of harvesting mechanism (19). This device mainly consists of a hydraulic cylinder (111) whose cylinder (112) is connected to frame (14) and whose rod (113) is connected to a chain (114). This chain (114) is wound partially on a wheel (115) guided in rotation in frame (14) and is connected at one end, the end removed from hydraulic cylinder (111), to second suspension element (54). During operation, this lifting device (110) does not interfere with the movement of harvesting mechanism (19) relative to frame (14). When harvesting mechanism (19) is to be lifted, it is sufficient to make rod (113) enter cylinder (112) of hydraulic cylinder (111) by injecting fluid in the latter. By so doing, rod (113) pulls, via chain (114), on second suspension element (54), which has the effect of making harvesting mechanism (19) rise by deformation of the deformable parallelogram.

Figure 8:
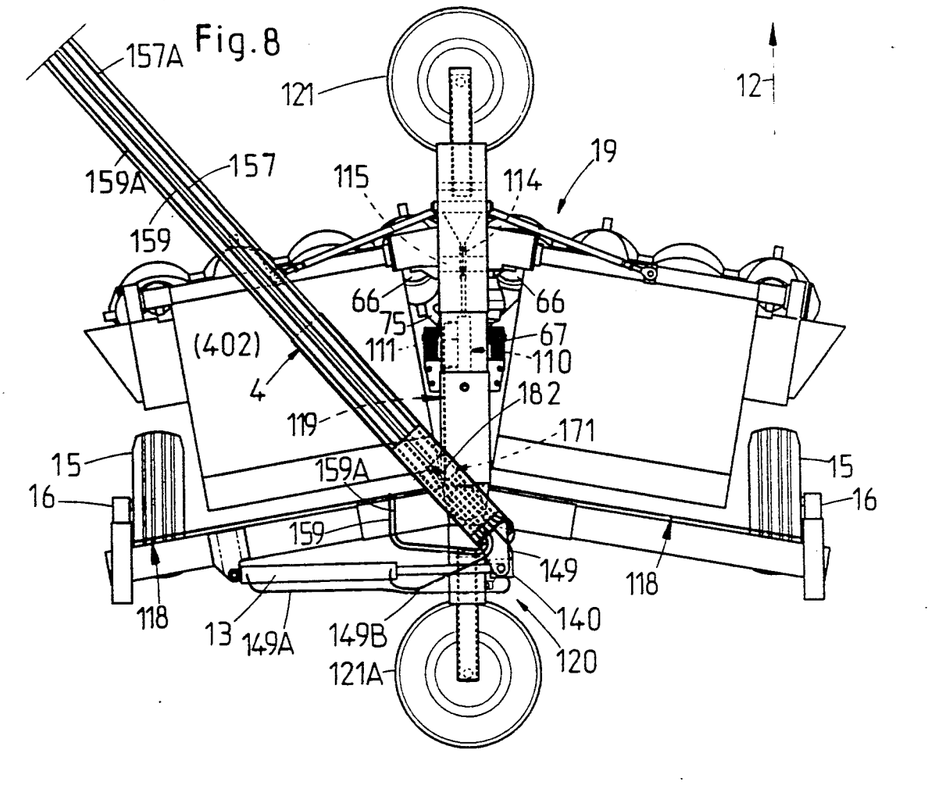
FIG. 8 represents a top view of the farm machine working to the right of the farm tractor.
Figure 16:
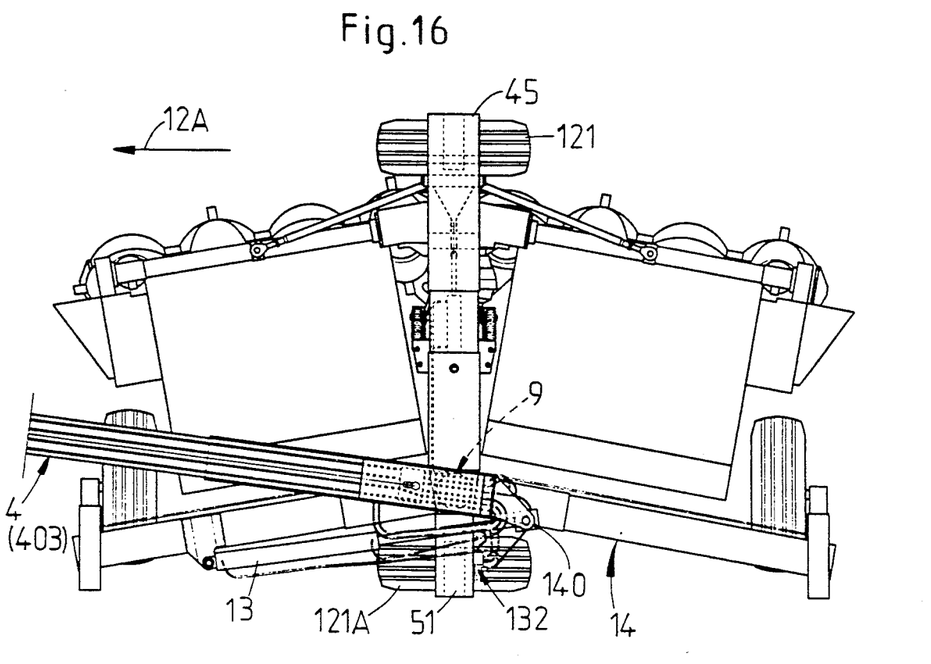
FIG. 16 represents a top view of the farm machine in transport position.

In FIG. 2, it is also shown that mower (1) comprises two transport wheels (121, 121A), one wheel (121) of which is connected to the free end of front bracket (45) and the other wheel (121A) of which is connected to rear bracket (51). Moreover, these transport wheels (121, 121A) extend in median plane (11) of body (3). Each transport wheel (121, 121A) is connected to a corresponding wheel arm (122, 123), which is connected to the frame (14) by a pivot-type joint (124, 125) with a geometric axis directed at least approximately perpendicular to the direction of advance (12) while working. The geometric axes of stubs (126, 126A) of two transport wheels (121, 121A) are, during the working phase, at least approximately vertical. A corresponding hydraulic cylinder (127, 127A), which makes it possible to make wheel arm (122, 123) and respective wheel (121, 121A) pivot relative to frame (14) around the geometric axis of corresponding joint (124, 125), is further provided between each wheel arm (122, 123) and frame (14). This makes it possible, during the mowing phase (FIGS. 1, 2 and 8) to retract transport wheels (121, 121A) by raising them and then lowering them for transport (FIG. 16). A respective guard (166), connected to corresponding bracket (45, 51), prevents the intake of foreign bodies in the brackets (45, 51).

Figure 12:
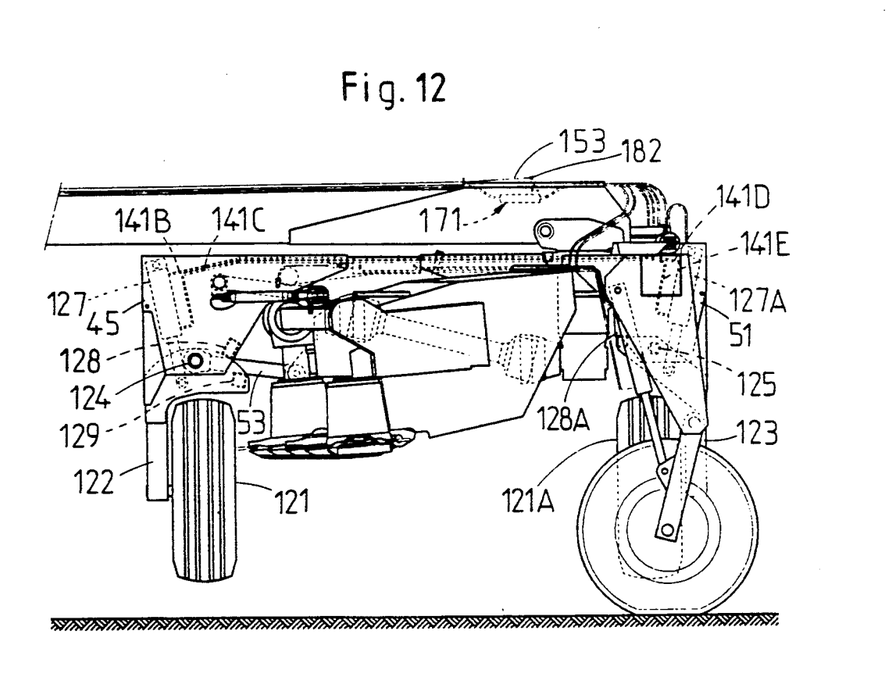
FIG. 12 represents a side view of the farm machine with the transport wheels down.

During transport (FIG. 16), these two transport wheels (121, 121A) roll respectively under front bracket (45) and under rear bracket (51) of frame (14). To position transport wheels (121, 121A) more precisely in a transport position, two brackets (45, 51) are each equipped with a stop (128, 128A) against which wheel arm (122, 123) rests at the end of travel, during the descent of each respective transport wheel (121, 121A) (FIGS. 12 and 14). In addition, the geometric axis of joint (124), of the pivot type, connecting wheel arm (122) of front transport wheel (121) to bracket (45), passes through the center of ball joint connection (55) of first suspension element (53). This arrangement makes it possible to obtain a small bulkiness for front bracket (45). Another feature of wheel arm (122) of front transport wheel (121) results from holding stop (129) which is intended, during transport, to support, by first suspension element (53), harvesting mechanism (19) in a high position (FIGS. 12 and 14).

Figure 7:
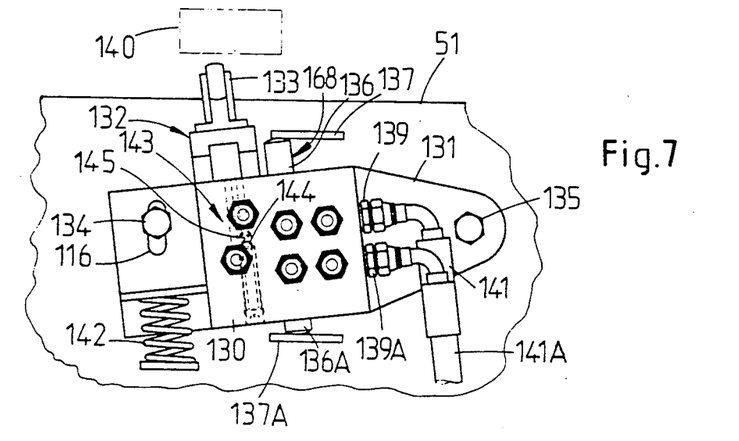
FIG. 7 represents a view of the retracted detection device.

In FIGS. 3 to 7, detection device (120), connected to the right outside side of rear bracket (51) of frame (14), is shown in detail. This detection device (120) comprises a body (130) connected rigidly to a sheet metal support (131) and equipped with a distributor (132) of a 2/2 type controlled by a control element (133) of a control lever type. Two holes, one (116) oblong and the other (117) circular, are provided in sheet metal support (131) and are each penetrated by a respective bolt (134, 135) screwed into rear bracket (51). Thus attached to the rear bracket of frame (14), detection device (120) can pivot around the axis of bolt (135), going through circular hole (117) under the action of a retracting means (168) with two Cylinders (136, 136A). These cylinders (136, 136A) extend in one another's extension and their pistons each come out from a respective face of body (130), to extend at least approximately without play between two stops (137, 137A) connected rigidly to rear bracket (51). The outside end of the piston of each cylinder (136, 136A) is advantageously bent and rests on respective stop (137, 137A), under the effect of hydraulic pressure being exerted on its other end housed inside body (130) when the cylinder (136, 136A) is operational. The oil is brought to cylinders (136, 136A) by two pipes (141, 142A) connected to joining pieces (139, 139A) screwed into body (130), of which one (139) supplies cylinder (136) and the other (139A) supplies cylinder (136A). This arrangement makes it possible, thanks to the action of the oil under pressure on one (136) of cylinders (136, 136A), to cancel the action of detection device (120) by making it rotate several degrees around first bolt (135) (FIG. 7).

In FIGS. 2 to 7 in particular, it is shown that the oil from the circuit of cylinders (136, 136A) of retracting means (168), brought by the pair of pipes (141, 141A), is imparted in parallel to two other identical pairs of pipes (141B, 141C, 141D, 141E) of which the first pair of pipes (141B, 141C) supplies cylinder (127) combined with front transport wheel (121) and the second pair of pipes (141D, 141E) supplies cylinder (127A) of rear transport wheel (121A). The descent of transport wheels (121, 121A) is also performed at least approximately simultaneously with the retraction of detection device (120).

A spring (142), placed between rear bracket (51) and sheet metal support (131), maintains detection device (120) in an unretracted position. Thus, the inevitable slight leakages in the barely used circuits and the weight of detection device (120) cannot cause the retraction of the latter.

Figure 9:
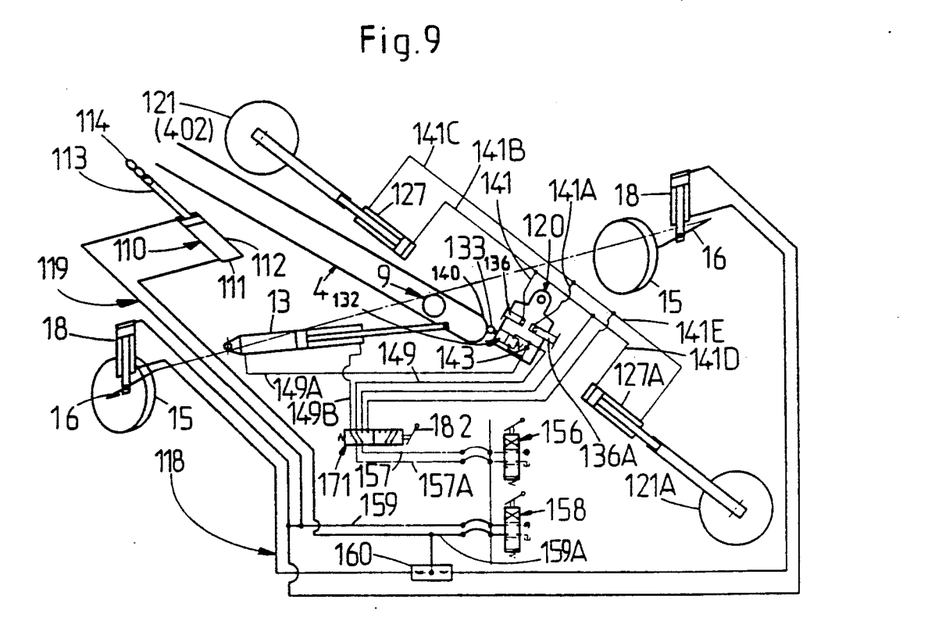
FIG. 9 represents the hydraulic diagram of the machine when the latter works to the right of the farm tractor.
Figure 17:
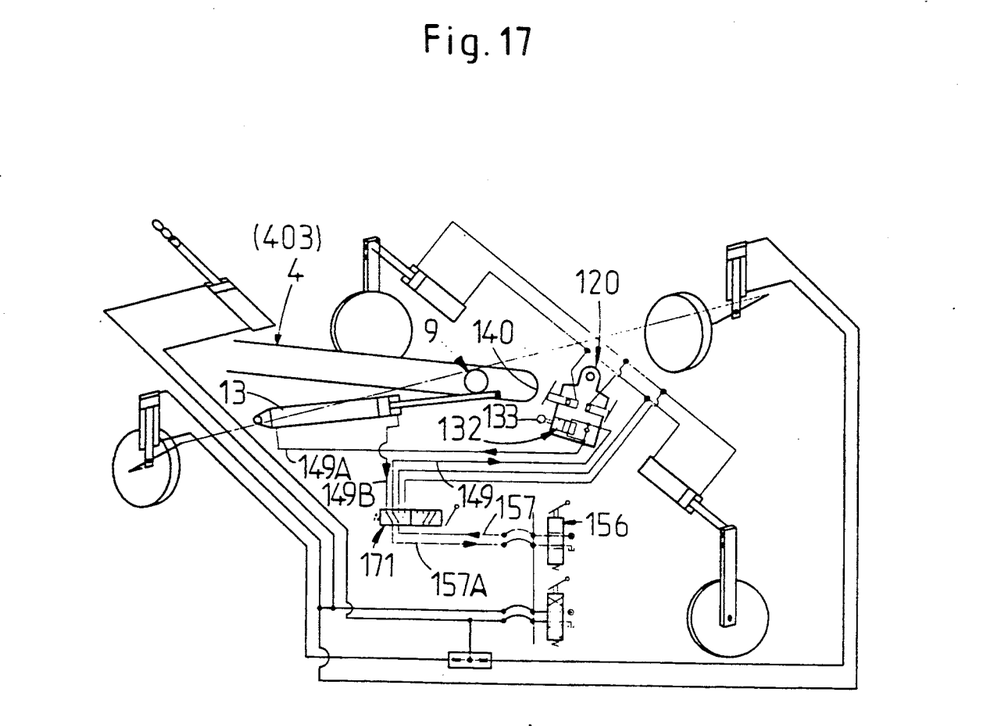
FIG. 17 represents the hydraulic diagram of the farm machine in a transport position.

Distributor (132) equipped in parallel with a nonreturn valve (143) is supplied by a pipe (149) and is coupled with the large chamber of maneuvering cylinder (13) of tongue (4) by a pipe (149A). The small chamber of the cylinder (13) is supplied by another pipe (149B) (FIGS. 9 and 17). When detection device (120) is in an unretracted position, distributor (132) can be controlled by a cam (140) acting on control lever (133) and which is arranged directly or indirectly on tongue (4) (in the embodiment, this cam (140) is connected to the end of the rod of cylinder (131)). Thus, as soon as tongue (4) comes above distributor (132), cam (140) rests on control lever (133) which closes the distributor (132). On the other hand, when the action of detection device (120) is cancelled, i.e., when it is retracted, cam (140) can no longer reach control lever (133) and distributor (132) remains conducting. Nonreturn valve (143) mounted in parallel with distributor (132), comprises a ball (144) and a spring (145) which cooperate with a bolt (146) and a tube (147) pierced with holes necessary to the installation and to the good operation of the valve (143).

In FIGS. 1, 2, 8, 12 and 14 in particular, it is seen that an inverter (171) known to one skilled in the art, in addition, is arranged close to joint (9) of tongue (4). This inverter (171) is an inverter with a pivoting lever (182), the pivoting lever (182) can be actuated from tractor (2) by a control element (155) made in the form of a small rope (153). This inverter (171) is supplied oil by a pair of pipes (157, 157A), supported by tongue (4) and connected to a first distributor (156) of the 4/3 type, belonging to tractor (2). If pivoting lever (182) of inverter (171) is not actuated, the oil is distributed by inverter (171) to the circuit of maneuvering cylinder (13) of tongue (4) (FIGS. 9, 11, 15 and 17).

Figure 13:
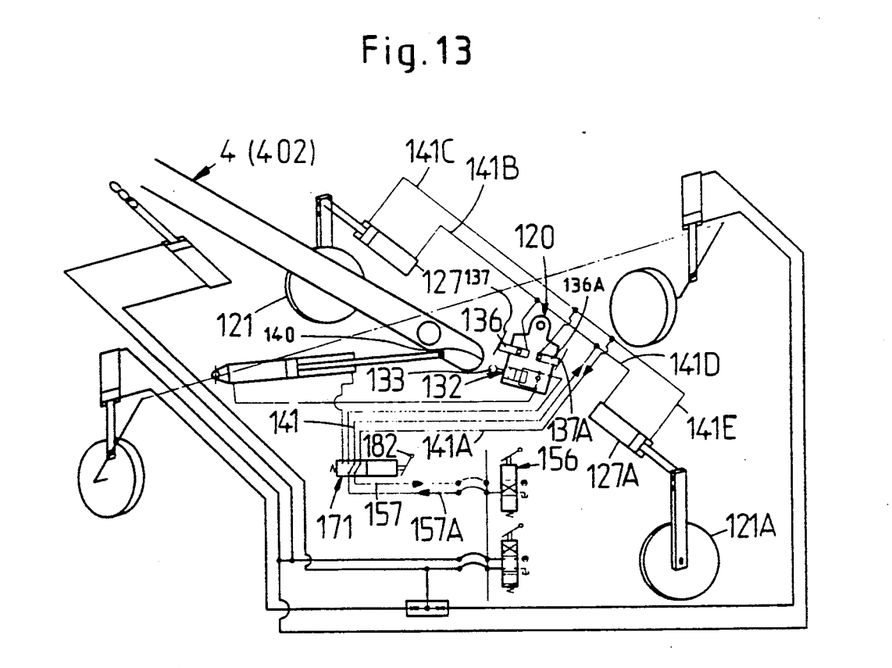
FIG. 13 represents the hydraulic diagram of the farm machine with the transport wheels down.

If, on the contrary, pivoting lever (182) is actuated by control element (155), the oil is distributed by inverter (171) to the circuits of cylinders (136, 136A) of detection device (120) and of cylinders (127, 127A) of transport wheels (121, 121A) which are, as stated above, coupled in parallel (FIG. 13). A second distributor (158) of the 4/3 type of tractor (2) supplies, via a pair of pipes (159, 159A), on the one hand, circuit (11) of two cylinders (18) of working wheels (15) and, on the other hand, circuit (119) of cylinder (111) of lifting device (110). To keep frame (14) approximately parallel to ground (109), during the movement in height of the latter, a flow divider (160) equips circuit (118) of cylinder (18) of transport wheels (15).

FIG. 1 shows mower (1) with tongue (4) in end work position (401) making it possible for harvesting mechanism (19) to work to the left of tractor (2). To pass from this position (401) to work position (402) to the right of tractor (2) (FIGS. 8 and 9), the user controls, by first distributor (156) of tractor (2), the extension of the rod of cylinder (13) which causes the pivoting of tongue (4) from the right toward the left around geometric axis (10) of joint (9). To do this, distributor (156) is actuated so that tractor (2) supplies oil to the large chamber of cylinder (13) through pipe (157), inverter (171), pipe (149) of distributor (132) which is open, and pipe (149A). The oil contained in the small chamber of cylinder (13) returns to tractor (2) through pipe (149B) of inverter (171) and of pipe (157A). When tongue (4) comes into an intermediate work position (402), cam (140) actuates control lever (133) of distributor (132), causing the cutoff of the supply of cylinder (13) and thereby the immobilization of tongue (4) relative to body (3) of mower (1).

Then, to pass again from an intermediate work position (402) (body (3) of mower (1) to the right of tractor (2)) to an end work position (401) (body (3) of mower (1) to the left of tractor (2)), it is sufficient to control the return of the rod of cylinder (13) by first distributor (156) to cause the pivoting of tongue (4) from the left toward the right around geometric axis (10) of joint (9). To do this, distributor (156) is again actuated so that tractor (2) supplies oil to the small chamber of cylinder (13) through pipe (157A), inverter (171) and pipe (149B). The oil contained in the large chamber of cylinder (13) returns to tractor (2) through pipe (149A), valve (143) which is conducting in this direction, pipe (149), inverter (171) and pipe (157). End work position (401) is reached when, for example, the rod of cylinder (13) is returned to the maximum in the body of the cylinder (13).

FIGS. 10 to 17 display the transformation of mower (1) to bring it from the work position (FIG. 8) in which it is moved in direction (12), into the transport position (FIG. 16) in which it is moved in direction (12A).

Figure 10:
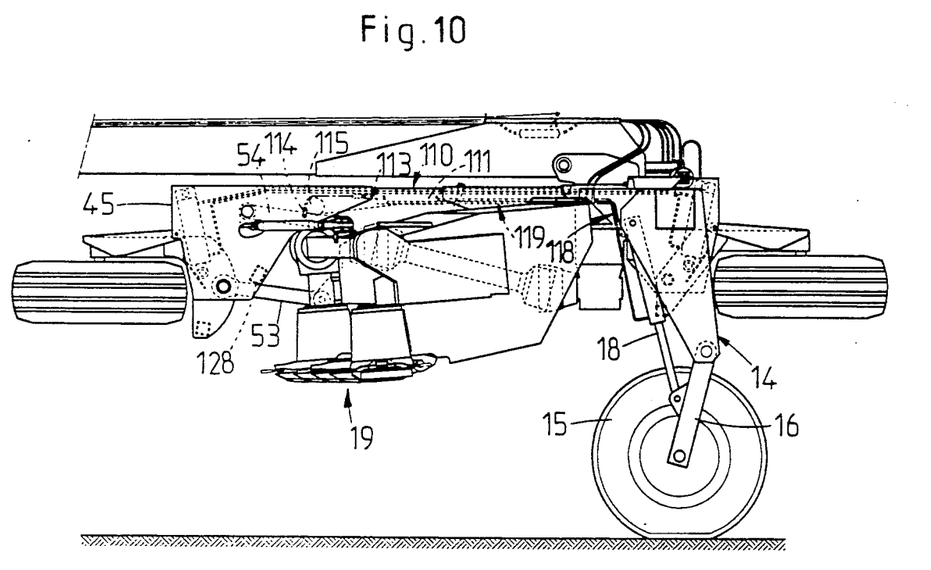
FIG. 10 represents side view of the farm machine with the frame in high position.
Figure 11:
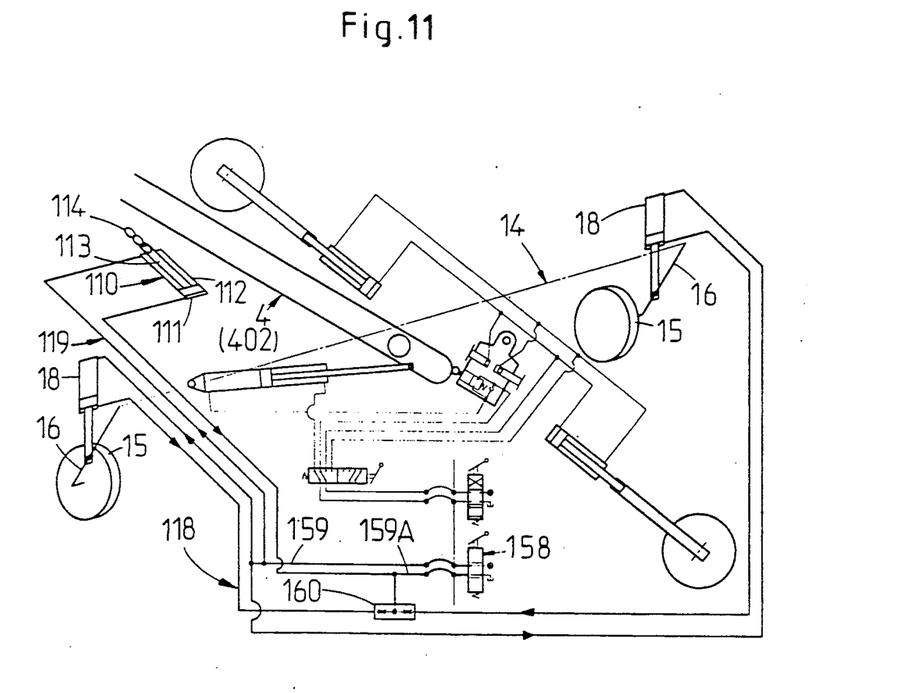
FIG. 11 represents the hydraulic diagram of the farm machine with the frame in high position.

The first transformation phase comes out in FIGS. 10 and 11. By actuating second distributor (158) of tractor (2), on the one hand, circuit (118) of cylinders (18) of working wheels (15) is supplied oil, and, on the other hand, circuit (119) of cylinder (111) of lifting device (110) of harvesting mechanism (19) is supplied oil. This has the effect of placing frame (14) and harvesting mechanism (19) in a high position. In this position, first suspension element (53) is positioned against stop (128) of front bracket (45).

The second phase of the transformation comes out in FIGS. 12 and 13. First, pivoting lever (182) of inverter (171) is actuated by small rope (153) so that inverter (171) can distribute oil to the circuits of cylinders (136, 136A) of detection device (120) and cylinders (127, 127A) of transport wheels (121, 121A). While maintaining the action on pivoting lever (182) of inverter (171), first distributor (156) of tractor (2) is then controlled so that tractor (2) supplies oil to cylinder (136) of detection device (120) and the large chamber of cylinders (127, 127A) of transport wheels (121, 121A). This supply is performed through pipe (157A), inverter (171), pipe (141) and pipes (141B, 141D).

The oil contained in cylinder (136A) and in the small chamber of cylinders (127, 127A) returns to tractor (2) through pipes (141C, 141E), pipe (141A), inverter (171) and pipe (157). By so doing, cylinder (136) rests on corresponding stop (137) of rear bracket (51) and makes detection device (120) pivot around bolt (135) so that cam (140) can no longer actuate control lever (133) of distributor (132) (FIG. 7). In parallel, transport wheels (121, 121A) descend by pivoting around their respective joint (124, 125). The supply stops when wheel arms (122, 123) strike respective stops (128, 128A) arranged on front bracket (45), or on rear bracket (51). In this position, holding stop (129) is in contact with first suspension element (53).

Then, small rope (153) is released to no longer actuate pivoting lever (182) of inverter (171).

Figure 15:
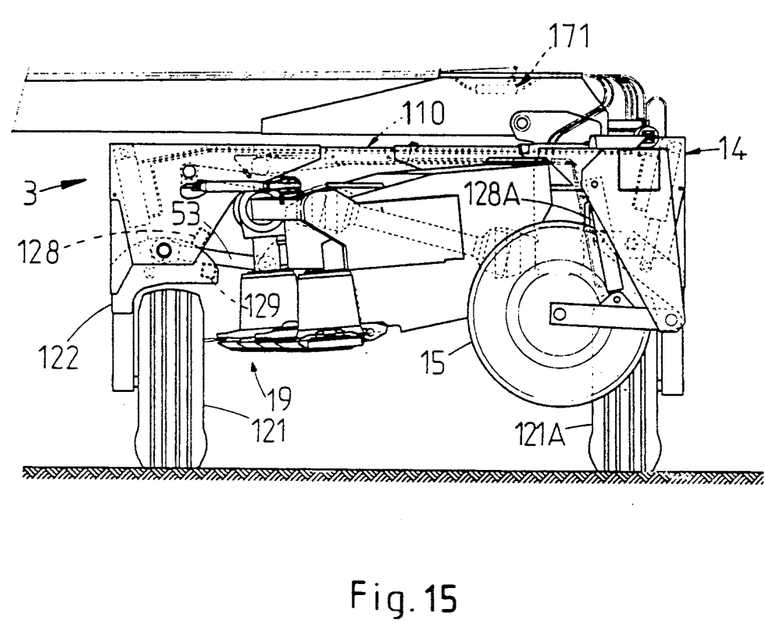
FIG. 15 represents the hydraulic diagram of the farm machine resting on the transport wheels.

The third phase of the transformation comes out in FIGS. 14 and 15. The user controls second distributor (158) of tractor (2) so that the latter supplies oil to the small chamber of cylinders (14) of working wheels (15). By so doing, working wheels (15) rise, and the weight of body (3) of mower (1) is made to rest on transport wheels (121, 121A). Since circuit (119) of cylinder (111) of lifting device (110) of harvesting mechanism (19) is coupled in parallel with circuit (118) of cylinders (18) of working wheels (15), or the large chamber of cylinder (111), whose rod (113) then comes out of cylinder (112), is also supplied. Harvesting mechanism (19) remains in a high position, however, since first suspension element (53) rests on holding stop (129) of wheel arm (122) of front transport wheel (121).

The last phase of the transformation is shown in FIGS. 16 and 17. Since detection device (120) is retracted, i.e., cam (140) can no longer actuate control lever (133) of distributor (132), the latter is conducting. It is then possible to make tongue (4) pass from intermediate position (402) into end transport position (403) by making it pivot completely toward the left around geometric axis (10) of joint (9). To do this, distributor (156) is actuated so that tractor (2) supplies oil to the large chamber of control cylinder (13 of tongue (4) through pipe (157) of inverter (171), pipe (149), distributor (132) which is open, and pipe (149A). The oil contained in the small chamber of cylinder (13) returns to tractor (2) by pipe (149B), inverter (171) and pipe (157A). End position (403) is reached when, for example, the rod of cylinder (13) comes out to the maximum of the cylinder (13).

To transform mower (1) from transport position (403) into a work position (401, 402), various operations will be done in the opposite direction. Detection device (120) will again be brought back into its unretracted position by supplying cylinder (136A).

Figure 18:
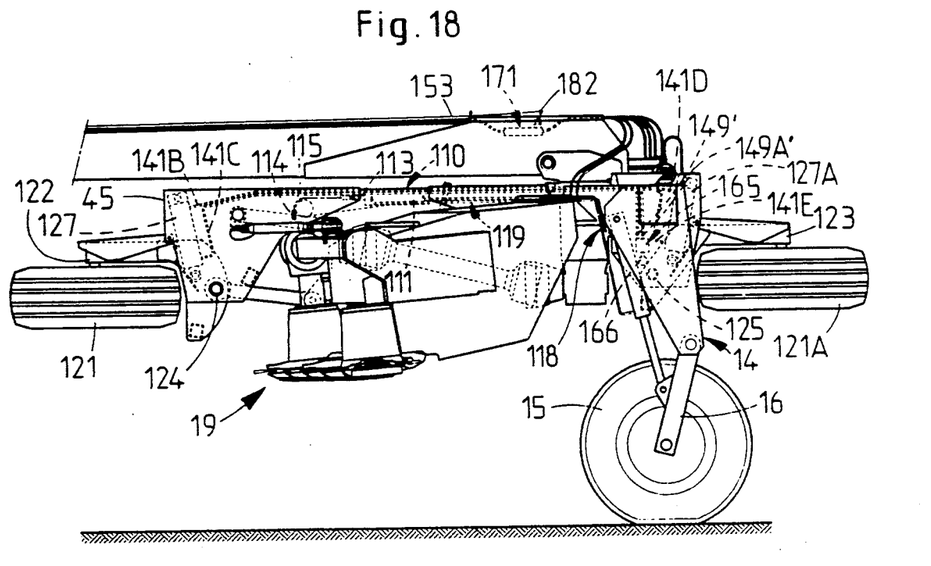
FIG. 18 represents another embodiment of the detection device of the farm machine.
Figure 19:
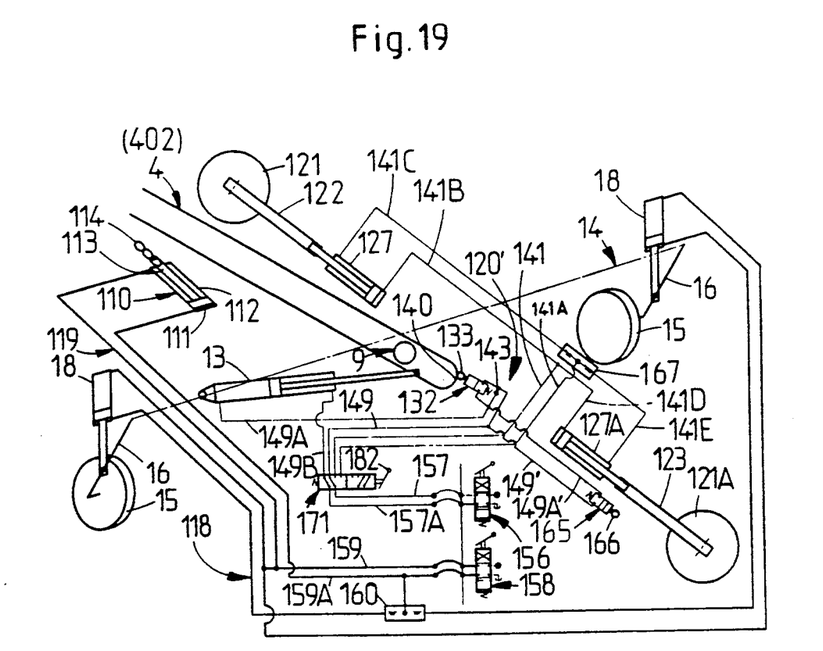
FIG. 19 represents the hydraulic diagram of this other embodiment of the detection device of the farm machine.

Another embodiment of a detection device (120') is shown in FIGS. 18 and 19. This detection device (120') also comprises a 2/2 distributor (132) which is, however, connected rigidly to rear bracket (51). Detection device (120') also comprises another 2/2 distributor (165) mounted in parallel, thanks to a pair of pipes (149', 149A'), on the pair of pipes (149, 149A). This distributor (165) is mounted rigidly on one of brackets (45, 51) (in the example shown, rear bracket (51)) and is equipped with a control lever (166).

Cylinder (127) of front transport wheel (121) is supplied oil by a pair of pipes (141B, 141C) and cylinder (127A) of rear transport wheel (121A) is supplied oil by a pair of pipes (141D, 141E). These two pairs of pipes (141B, 141C, 141D, 141E) are coupled in parallel with a pair of pipes (141, 141A). A flow divider (167) is incorporated in this circuit to supply oil to two cylinders (127, 127A) in an identical manner.

All other elements are identical with the preceding embodiment. Neither their structure nor their function will therefore be described again.

In this embodiment, the action of distributor (132) is cancelled when one of transport wheels (121, 121A) (in the embodiment, rear transport wheel (121A)) comes to the end of the travel of descent.

During the second phase of the transformation to pass from an intermediate work position (402) into a transport position (403), pivoting lever (182) of inverter (171) is actuated first by small rope (153) so that inverter (171) can distribute oil to two pairs of pipes (141B, 141C, 141D, 141E) of cylinders (127, 127A) of transport wheels (121, 121A). While maintaining the action on pivoting lever (182) of inverter (171), first distributor (156) of tractor (2) then is controlled so that tractor (2) supplies oil to the large chamber of cylinders (127, 127A) of transport wheels (121, 121A). This supply is performed through pipe (157A), inverter (171), pipe (141) and pipes (141B, 141D). The oil contained in the small chamber of cylinders (127, 127A) returns to tractor (2) through pipes (141C, 141E), flow divider (167), pipe (141A), inverter (171) and pipe (157). At the end of travel, wheel arm (123) of rear transport Wheel (121A) actuates control lever (166) of distributor (165) thereby making it conducting. Small rope (153) then is released to no longer actuate pivoting lever (182) of inverter (171).

During the last phase of the transformation, it is then possible to make tongue (4) pass from an intermediate position (402) into an end transport position (403) by making it pivot completely toward the left around geometric axis (10) of joint (9) even though distributor (132) is closed at the outset. To do this, distributor (156) of tractor (2) is actuated so that the tractor (2) supplies oil to the large chamber of maneuvering cylinder (13) of tongue (4) through pipe (157), inverter (171), pipe (149), pipe (149'), distributor (165) which is open, pipe (149A') and pipe (149A). The oil contained in the small chamber of cylinder (13) returns to tractor (2) by pipe (149B), inverter (171) and pipe (157A).

Although it has not been mentioned, inverter (171) and distributors (132, 165) return, of course, to their neutral position, i.e., to a "conducting" position for distributor (132) and a "closed" position for distributor (165), the latter, in a known manner, when they are not actuated by a spring incorporated in the inverter (171), respectively in the distributors (132, 165).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. A farm machine (1) comprising:
   a body;
   a means for connecting said body to a motor vehicle, wherein said connecting means is connected to said body by a first joint with an axis directed upward and can be brought into two end positions, a first end position being a work position, and into an intermediate position by pivoting around said axis under action of a first maneuvering element;
   a detection device which detects said intermediate position of said connecting means and cuts off a power supply to said maneuvering element when said connecting means comes from said first end work position into said intermediate position and wherein operation of said detection device can be cancelled so that said first maneuvering element brings said connecting means beyond said intermediate position into a second end position.

2. A farm machine according to claim 1, wherein said detection device is connected to said body.

3. A farm machine according to claim 1, wherein said detection device is retractable.

4. A farm machine according to claim 3, wherein said detection device is connected to said body by a second joint.

5. A farm machine according to claim 3, wherein an elastic element contributes at least partially to maintaining said detection device in an operational position.

6. A farm machine according to claim 3, further comprising a retracting means for retracting said detection device and which can be actuated from said motor vehicle.

7. A farm machine according to claim 6, wherein said retracting means comprises at least one cylinder.

8. A farm machine according to claim 6, wherein said retracting means is arranged on said detection device.

9. A farm machine according to claim 8, wherein said retracting means comprises two plunger cylinders which extend at least approximately without play between two stops integrally formed with the body.

10. A farm machine according to claim 1, wherein said detection device comprises a first control element which can occupy two positions, a first position in which the power supply to said first maneuvering element is established and a second position in which the power supply, to said first maneuvering element is cut off.

11. A farm machine according to claim 10, wherein passing said control element from the first position to the second position is achieved by a cam acting on said control element.

12. A farm machine according to claim 11, wherein
   (a) the detection device is connected to the body, and
   (b) the cam is connected directly or indirectly to the connecting means.

13. A farm machine according to claim 12, wherein
   (a) the first maneuvering element of the connecting means is a cylinder, and
   (b) the cam is integral with said cylinder.

14. A farm machine according to claim 10, wherein
   (a) the first maneuvering element of the connecting means is a cylinder, and
   (b) the first control element controls a distributor arranged on the detection device.

15. A farm machine according to claim 14, wherein said distributor is a distributor of a 2/2 type equipped in parallel with a nonreturn valve.

16. A farm machine according to claim 15, wherein
   (a) the retracting means comprises at least one cylinder, and
   (b) a circuit of the maneuvering cylinder of the connecting means and a circuit of the at least one cylinder of the retracting means are supplied from a common circuit, and wherein an inverter makes it possible to power supply either the circuit of the maneuvering cylinder or to the circuit of the at least one cylinder of the retracting means.

17. A farm machine according to claim 16, wherein said inverter is controlled from said motor vehicle by a second control element.

18. A farm machine according to claim 17, wherein said inverter is an inverter with a pivoting lever and wherein said second control element comprises a traction element connected to said pivoting lever and maneuverable from said motor vehicle.

19. A farm machine according to claim 1, wherein said first maneuvering element of said connecting means is a cylinder.

20. A farm machine according to claim 11, wherein said body rests on ground by a plurality of wheels of which a predetermined number rotate, during work, in planes of rotation extending at least approximately orthogonally to a longitudinal direction of the body and of which a predetermined number rotate, during transport, in planes of rotation extending at least approximately parallel to said longitudinal direction of said body.

21. A farm machine according to claim 20, wherein said wheels used for transport are brought into their transport position by at least one second maneuvering element.

22. A farm machine according to claim 21, wherein said at least one second maneuvering element is combined with each wheel used during transport.

23. A farm machine according to claim 21, wherein said at least one second maneuvering element is a cylinder.

24. A farm machine according to claim 23, wherein
(a) said retracting means comprises at least one cylinder, and
(b) a circuit of the at least one cylinder of the retracting means and a circuit of the at least one second maneuvering cylinder of the wheels used during transport are coupled in parallel.

25. A farm machine according to claim 1, wherein
(a) said detection device comprises a first control element which can occupy two positions, a first position in which the supply power supply to the first maneuvering element is established and a second position in which the power supply to the first maneuvering element is cut off,
(b) said first maneuvering element of the connecting means is a cylinder,
(c) said first control element controls a distributor arranged on said detection device,
(d) said distributor is a distributor of a 2/2 type equipped in parallel with a nonreturn valve, and
(e) an additional distributor of a 2/2 type is provided whose opening and closing are controlled by a corresponding second control element and which is connected in parallel with the 2/2 distributor of the detection device.

26. A farm machine according to claim 25, wherein
(a) said body rests on ground by a plurality of wheels of which a predetermined number rotate, during work, in planes of rotation extending at least approximately orthogonally to a longitudinal direction of the body and of which a predetermined number rotate, during transport, in planes of rotation extending at least approximately parallel to said longitudinal direction of the body, and wherein
(b) at least one of said wheels used during transport acts, when it is brought into a transport position, directly or indirectly on the control element of the additional distributor to control the opening of said additional distributor.

27. A farm machine according to claim 26, wherein
(a) said wheels used during transport are brought into the transport position by at least one second maneuvering element,
(b) said at least one second maneuvering element is a cylinder, and
(c) a circuit of said first maneuvering cylinder of the connecting means and a circuit of the at least one second maneuvering cylinder of the wheels used during transport are supplied from a common circuit, and wherein an inverter makes it possible to supply oil to either the circuit of said first maneuvering cylinder of the connecting means, or the circuit of said maneuvering cylinder of the wheels used during transport.

28. A farm machine according to claim 27, wherein
(a) a maneuvering cylinder is combined with each wheel used during transport, and
(b) a circuit of the maneuvering cylinders of the wheels used during transport comprises at least one flow divider.

29. A farm machine according to claim 27, wherein the inverter is controlled from the motor vehicle by a second control element.

30. A farm machine according to claim 29, wherein the inverter is an inverter with a pivoting lever and wherein the second control element comprises a traction element connected to said pivoting lever which is maneuverable from the motor vehicle.

31. A farm machine according to claim 1, wherein a second end position of said connecting means is a transport position, and said intermediate position is another work position.

32. A farm machine according to claim 31, wherein said first joint of said connecting means extends, in a top view, in a median part of said body being considered crosswise to a direction of advance of said farm machine while working, and wherein said two work positions of said connecting means extend at least approximately symmetrically relative to a vertical plane directed in the direction of advance of said farm machine while working and passing through an axis of said first joint.

33. A farm machine according to claim 1, wherein said farm machine is a harvesting machine.

34. A farm machine according to claim 33, wherein said harvesting machine is a mower with or without elements for processing a cut product.

* * * * *